United States Patent [19]
Gleason

[11] 3,728,418
[45] Apr. 17, 1973

[54] BLEND OF STYRENE POLYMERS FOR USE IN FLOOR POLISH COMPOSITIONS

[75] Inventor: Edward Hinsdale Gleason, Monroeville, Pa.

[73] Assignee: Sinclair-Koppers Company, Pittsburgh, Pa.

[22] Filed: Oct. 13, 1970

[21] Appl. No.: 80,501

Related U.S. Application Data

[62] Division of Ser. No. 791,776, Jan. 16, 1969, abandoned.

[52] U.S. Cl.............260/898, 260/22 CB, 260/27 R, 260/28.5 R, 260/29.6 RW, 260/29.6 WB, 260/30.6 R, 260/33.2 R, 260/873, 260/897 B, 117/138.8 A, 117/139
[51] Int. Cl...............................................C08f 29/56
[58] Field of Search..............................260/898

[56] References Cited

UNITED STATES PATENTS

| 3,467,610 | 9/1969 | Fiarman et al. | 260/22 |
| 3,457,208 | 7/1969 | Sullivan et al. | 260/28.5 |
| 2,767,153 | 10/1956 | Sutton | 260/29.6 |
| 3,502,604 | 3/1970 | Nakatsuka et al. | 260/29.6 |

*Primary Examiner*—John C. Bleutge
*Assistant Examiner*—C. J. Seccuro
*Attorney*—William G. Kratz, Jr. et al.

[57] ABSTRACT

A floor polish composition having excellent resistance to plasticizer migration contains water, a mixture of a styrene copolymer (styrene and acrylic or methacrylic acid) and a styrene multi-polymer (styrene, acrylic acid, an ester of acrylic acid and acrylonitrile) and suitable waxes, alkali soluble resins and surfactants.

1 Claim, No Drawings

BLEND OF STYRENE POLYMERS FOR USE IN FLOOR POLISH COMPOSITIONS

This application is a divisional application of Ser. No. 791,776 filed Jan. 16, 1969, now abandoned.

BACKGROUND OF THE INVENTION

Plasticizer migration is a problem encountered with floor polish films. Most of the new hard floor coverings are made of vinyl that is rich in plasticizers, such as dioctyl phthalate. The plasticizer is able to migrate from the flooring into a polish film if the composition of the polish film has an affinity for the plasticizer. The occurrence of such migration causes the dirt pick-up of the polish to increase and detracts from the usefulness of the polish.

It has now been found that the use of a blend of a styrene copolymer and an especially prepared styrene multi-polymer containing controlled amounts of styrene, acrylic, or methacrylic acid, an ester of such acid and acrylonitrile results in overcoming the affinity of the polish film for plasticizers.

The term "plasticizer migration" is used herein to define the migration of plasticizers used in floor tiles, such as vinyl tiles, into a polish film containing acrylate or styrene-acrylate polymers, the migration leading to tackiness in the film that makes the film subject to dirt pick-up.

SUMMARY OF THE INVENTION

Floor polish compositions containing alkali soluble resins, waxes, surfactants and aqueous emulsion styrene polymers are made resistant to plasticizer migration by the use of a specific admixture of styrene polymers. The polymer content of the admixture consists essentially of 50–80 percent by weight of: (a) a styrene copolymer consisting of styrene and 5–10 percent acrylic or methacrylic acid and 50–20 percent by weight of: (b) a styrene multipolymer consisting of 10–40 percent by weight of styrene and 90–60 percent of a mixture of ethylenically unsaturated monomers of the formula:

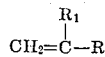

wherein R is —COOH, —COOR$_2$ wherein R$_2$ is an alkyl group having 1–8 carbon atoms, and —C $\equiv$ N, and R$_1$ is hydrogen or methyl. This mixture of ethylenically unsaturated monomers contains from 1–10 percent by weight of said monomer where R is —COOH, 30–80 percent of said monomer where R is —COOR$_2$ and 10–25 percent of said monomer where R is —C $\equiv$ N, based on the multi-polymer.

DETAILED DESCRIPTION

The floor polish composition contains a specific ratio of a styrene emulsion copolymer and a specially prepared styrene multi-polymer, containing controlled amounts of monomers. These two polymers are present in an aqueous admixture. The admixture contains as polymers 50–80 percent of a styrene copolymer and 50–20 percent of a styrene multi-polymer.

The styrene copolymer is an emulsion polymer comprised of 90–95 percent styrene and 10–5 percent of an ethylenically unsaturated monocarboxylic acid selected from acrylic and methacrylic acid. This copolymer is generally termed a hard polymer because of its brittle properties and although forming a tough film, is subject to crazing or cracking if used alone in floor polishes. When employed in polishes, significant amounts of plasticizers are needed to reduce the brittle character of the polymer.

The specially prepared styrene emulsion multi-polymer consists of a polymer formed from 10–40 percent styrene and 90–60 percent of a mixture of ethylenically unsaturated monomers. The ethylenically unsaturated monomers are all of the general formula:

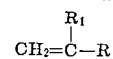

wherein R is —COOH; or R is —COOR$_2$, wherein R$_2$ is an alkyl group having 1–8 carbon atoms; or R is C $\equiv$ N; and R$_1$ is selected from hydrogen and a methyl group.

In order to obtain the beneficial properties of the polish of the present invention, the resistance to plasticizer migration, the mixture must have certain percentages of the various ethylenically unsaturated monomers. The mixture of ethylenically unsaturated monomers must contain based on the multi-polymer, from 1–10 percent by weight of the ethylenically unsaturated monomer wherein R is —COOH, such as acrylic acid or methacrylic acid. From about 30–80 percent of the mixture must be the ethylenically unsaturated monomer wherein R is —COOR$_2$, with R$_2$ being an alkyl group of from 1–8 carbon atoms, such as ethyl acrylate, 2-ethylhexyl acrylate, butyl acrylate, ethyl methacrylate and the like. The remaining monomer, acrylonitrile or methacrylonitrile must be present in about 5–25 percent.

The emulsion polymers are readily prepared from the desired monomers by conventional aqueous emulsion polymerization procedures. Preferably, the monomers are premixed, the catalyst is premixed to form an aqueous solution or slurry and these two premixes added to an aqueous charge in a reactor. The catalyst premix comprises water, catalyst, dispersants, and emulsifying agents. Conventional polymerization catalysts or mixtures thereof including potassium persulfate, benzoyl peroxide, lauroyl peroxide, cumene hydroperoxide, di-tertiary-butyl peroxide, azobisisobutryonitrile and the like. The catalysts are generally used in about 0.01–1.0 part per 100 parts of total monomers.

Conventional emulsifying agents such as alkali metal salts of long chain alkyl sulfates and sulfonates, ethylene oxide condensates of long chain fatty acids, alcohols or mercaptans, sodium salts of sulfonated hydrocarbons, alkyl arylsulfonates and the like are usable. Representative emulsifying agents include such compounds as sodium lauryl sulfate, sulfosuccinic acid esters, sodium salts of bioctyl sulfosuccinic acid, sodium salts of sulfonated cetyl alcohol, sodium pyrophosphate and alkyl aryl polyether alcohol.

The polymerizations are carried out under acidic conditions and the aqueous emulsion polymer pH raised to a pH of about 8–10, following the polymerization, with inorganic or organic bases such as sodium hydroxide, ammonium hydroxide, potassium hydroxide, monoethanolamine, etc. The water content of the aqueous system is generally such that between about 30–55 percent solids are present during the polymerization, with the amount increased or decreased as desired.

To form the polish compositions of the present invention, the two styrene polymers, the styrene copolymer emulsion and the styrene multi-polymer emulsion, are mixed together and there are added thereto plasticizers, dispersing agents or coalescing agents, an alkali soluble resin and a suitable wax emulsion, all of which are generally known in the art. The particular polish components that are added to the novel blend of styrene polymers of the invention are up to the user. These components are familiar to the polish formulation art and are not critical to the present invention.

Examples of suitable alkali-soluble resins are rosin acid, maleate-modified rosin acid ester, shellac, styrene, styrene-maleic anhydride copolymers, polyesters or alkali soluble alkyds, pentaerythritol esters of rosin, manilla gum, Loba gum and the like.

Suitable waxes, which are generally added as about a 10–20 percent by weight aqueous emulsion, are the animal, vegetable and synthetic waxes such as carnuba, polyethylene, polypropylene, oxidized microcrystalline wax, beeswax, montan, and the like.

In addition, about 0.5–1 percent based on the total polish composition of a levelling or coalescing agent is added, such as tributoxy ethyl phosphate, triethyl phosphate, tributyl phosphate, tricresyl phosphate, triphenyl phosphate, diethylene glycol monomethyl ether, diethylene glycol monoethyl ether and the like.

The invention is further illustrated by the following examples wherein parts are parts by weight unless otherwise indicated.

EXAMPLE I

A styrene copolymer emulsion (Emulsion A) was prepared using conventional procedures to produce a copolymer containing 90 parts styrene and 10 parts acrylic acid.

A styrene multi-polymer emulsion (Emulsion B) was prepared, by conventional emulsion polymerization, having the following compositions:

| | |
|---|---|
| Styrene | 13.5 parts |
| Ethyl Acrylate | 65 parts |
| Acrylonitrile | 20 parts |
| Acrylic Acid | 1.5 part |

Both copolymer emulsions were adjusted to a solids content of 15 percent by weight with water.

A polish composition was then prepared by combining 46.7 parts of Emulsion A; 20.0 parts Emulsion B; 12.1 parts of a rosin-polyol condensation resin (Pentalyn 255, 14.9 percent solids); 10.1 parts of a non-ionic polyethylene wax emulsion (AC-629, a low molecular weight polyethylene wax, m.p. 213°–221°F., Allied Chemical Corp., 14.9 per cent solids); 0.2 parts of tributoxyethyl phosphate as plasticizer; 0.25 parts diethylene glycol monomethyl ether; 0.5 parts ethylene glycol; 0.1 part 2-pyrolidone; 3.7 parts water and 0.4 parts FC-128 at 1 percent solids. The polish composition had a total solids content of 14.9 per cent and a pH of 8.8.

EXAMPLE II

A copolymer emulsion was prepared comparable to Emulsion A of Example I and designated Emulsion C. A multi-polymer (Emulsion D) was prepared, using conventinal emulsion polymerization procedures, having the following composition:

| | |
|---|---|
| Styrene | 50 parts |
| 2-Ethylhexyl Acrylate | 45 parts |
| Acrylic Acid | 5 parts |

A polish composition was prepared similar to that of Example I but using Emulsions C and D in place of Emulsions A and B. The polish composition had a solids content of 13 percent and a pH of 8.9.

EXAMPLE III

The floor polish compositions of Examples I and II were compared with respect to plasticizer migration. The plasticizer migration was determined by the amount of soiling on dirt pick-up evidenced by the polish when used on various substrates. Six substrates were used, including linoleum, vinyl asbestos tile, solid vinyl tile, asphalt tile, rubber tile and vinyl corlon. The application and test methods used to prepare the floor samples were from CSMA Bulletin No. 339–63. Numerical values were used to rate the results as follows: (1) Excellent; (2) Excellent-Good; (3) Good-Excellent; (4) Good; (5) Good-Fair; (6) Fair-Good; (7) Fair; (8) Fair-Poor; (9) Poor-Fair; (10) Poor; (11) Unacceptable. The results of the testing are listed in Table I.

TABLE I

| Substrate | Time of Exposure | Dirt Pick-Up Resistance | |
|---|---|---|---|
| | | Polish of Example I | Polish of Example II |
| Linoleum | 1 day | 3 | 5 |
| | 1 week | 2 | 4 |
| Vinyl Asbestos | 1 day | 3 | 5 |
| | 1 week | 5 | 8 |
| Vinyl | 1 day | 3 | 8 |
| | 1 week | 7 | 10 |
| Asphalt | 1 day | 3 | 5 |
| | 1 week | 5 | 5 |
| Rubber | 1 day | 3 | 5 |
| | 1 week | 3 | 7 |
| Vinyl Corlon | 1 day | 1 | 5 |
| | 1 week | 3 | 5 |

As is seen from the test results, the polish formulation of Example I has consistently increased dirt pick-up resistance, i.e, reduced plasticizer migration, than a comparable polish having a polymer blend without the acrylonitrile content.

EXAMPLE IV

Polish formulations prepared generally according to Example I and having the following blends of styrene copolymers and styrene multi-polymers are also resistant to plasticizer migration:

| Polymer Blends: | Styrene Copolymer | Styrene Multi-polymer |
|---|---|---|
| IV-1 | 5 parts acrylic acid<br>95 parts styrene | 15 parts styrene<br>55 parts 2-ethylhexyl acrylate<br>5 parts acrylic acid<br>25 parts acrylonitrile |
| IV-2 | 10 parts methacrylic acid<br>90 parts styrene | 20 parts styrene<br>60 parts butyl acrylate<br>5 parts methacrylic acid<br>15 parts acrylonitrile |
| IV-3 | 5 parts acrylic acid | 12 parts styrene |

|   |   |   |
|---|---|---|
|   | 95 parts styrene | 65 parts ethyl methacrylate<br>8 parts acrylic acid<br>15 parts acrylonitrile |
| IV-4 | 5 parts methacrylic acid | |
|   | 95 parts styrene | 20 parts styrene<br>68 parts ethyl acrylate<br>2 parts acrylic acid<br>10 parts acrylonitrile |

What is claimed is:

1. A blend of styrene polymers useful in combination with a wax and an alkali-soluble resin in the preparation of floor polish compositions that are resistant to plasticizer migration, said blend comprising an admixture of 50–80 percent of a styrene copolymer and 50–20 percent of a styrene multi-polymer;

a. said styrene copolymer consisting of 90–95 percent by weight of said copolymer of styrene and 5–10 percent by weight of an ethylenically unsaturated monocarboxylic acid selected from acrylic and methacrylic acid and;

b. said styrene multi-polymer consisting of 10–40 percent by weight of styrene and 90–60 percent by weight of a mixture of ethylenically unsaturated monomers of the formula:

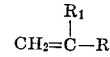

wherein R is selected from $-COOH$; $-COOR_2$ wherein $R_2$ is an alkyl group having 1–8 carbon atoms; and $-C \equiv N$; and $R_1$ is hydrogen or methyl; said styrene multi-polymer containing 1–10 percent by weight of said monomer where R is $-COOH$, 30–80 percent of said monomer where R is $-COOR_2$, and 5–25 percent of said monomer where R is $-C \equiv N$.

* * * * *